United States Patent
Ziegler et al.

(10) Patent No.: US 8,108,331 B2
(45) Date of Patent: Jan. 31, 2012

(54) METHOD AND SYSTEM FOR ENHANCING COMPUTER OBJECT RULES AND CATALOGS

(75) Inventors: Carsten Ziegler, Walldorf (DE); Hans-Georg Beuter, Heidelberg (DE); Michael Aakolk, Wiesloch (DE)

(73) Assignee: SAP AG, Walldorf (DE)

( * ) Notice: Subject to any disclaimer, the term of this patent is extended or adjusted under 35 U.S.C. 154(b) by 767 days.

(21) Appl. No.: 12/199,798

(22) Filed: Aug. 28, 2008

(65) Prior Publication Data
US 2010/0057665 A1    Mar. 4, 2010

(51) Int. Cl.
*G06N 5/02* (2006.01)
(52) U.S. Cl. .......................................... 706/47; 705/500
(58) Field of Classification Search .................... 706/47; 705/500
See application file for complete search history.

(56) References Cited

U.S. PATENT DOCUMENTS
2005/0251409 A1    11/2005    Johnson et al.

OTHER PUBLICATIONS

Biz A ("Externalize your business rules" May 21, 2007).*
Hall et al. ("The 2006 BPTrends Report on Business rules Products" Apr. 2006).*
Ziegler et al. ("Business Rules Framework plus—The Very Basics" Jun. 28, 2008).*

* cited by examiner

*Primary Examiner* — Jeffrey A Gaffin
*Assistant Examiner* — Lut Wong
(74) *Attorney, Agent, or Firm* — Kenyon & Kenyon LLP (57) ABSTRACT

A method, a machine-readable storage medium and a system are provided for enhancing computer rules in a computer application. In an embodiment, a rule is accessed from a set of computer rules provided by a computer application. The rule includes a number of fields, e.g., an attribute field and an enhancement type field. In response to receiving an input attribute and an input enhancement type, the rule is updated in the set of computer rules. The updated rule is implemented and operation of the updated rule in the computer application is altered based on the inputs.

8 Claims, 6 Drawing Sheets

METHOD AND SYSTEM FOR ENHANCING COMPUTER OBJECT RULES AND CATALOGS

CROSS-REFERENCE TO RELATED APPLICATION(S)

This application is related to U.S. patent application Ser. No. 12/200,885 filed concurrently herewith, which is herein incorporated by reference in its entirety.

COPYRIGHT AND LEGAL NOTICES

A portion of the disclosure of this patent document may contain material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

FIELD OF INVENTION

The present invention relates to a system, method, and computer-readable medium having instructions to execute a method for enhancing computer object rules by defining rule definitions as the rules content transitions from developer to end-user.

BACKGROUND AND PRESENT

Presently, when software content is delivered to an enterprise, the software contains rules for controlling the data on which the software operates and the data flow as well as the modifications that can be made to the software by a user or another third-party. The software developer/provider typically provides rules that are delivered with a default definition or content. The rule content can be, for example, the result if a certain event occurs or when a value equals a predetermined point and the like. The rule content may be changed by the software provider, for reasons such as issues related to a specific country, e.g., Germany or United States, or industry, e.g., petroleum or shipping. A third-party vendor, such as a software distributor or an installer and integrator of the software provided by the software provider, can also change the rule content. Ultimately, the customer will change and/or adopt rules that suit the customer's needs, which may include customized rules.

The rule content can also be changed by a second party such as a vendor or a third party such as a customer. Presently these changes to the rule content may interfere with the default rule set delivered by the software provider and with any new content added by a second party and/or a third-party. As a result of such interference, it is usually not possible that rules can be enhanced and/or coexist during new releases or upgraded service packages of the software or the rules content. A customer had to decide whether it wanted to take the upgrades of the rules content or whether it wanted to maintain its own enhancements as presently implemented. The software rules content can be used in a computer application to determine how the computer application will react to certain inputs. Examples of computer applications include customer relationship management applications, enterprise resource planning including financial and operations applications, and small, medium, or large business applications, e.g., legacy applications, such as those provided by SAP.

As an example, in a business implementation, a business rule engine may have certain pricing rules and payment rules that determine the outcome result for a given input condition or value. For instance, a pricing rule may not allow a pricing discount of greater than 30%, while a payment rule may not allow for payments to be made after 180 days without incurring an interest charge. When this software is delivered to a vendor, or software provider partner, the vendor partner may also have its own pricing and payment rules for a particular industry. The partner's pricing and payment rules may differ from the software providers pricing and payment rules because of the particular industry. For instance, the vendor partner rule may not allow for discounts greater than 25% and may incur an interest charge when payments are later than 90 days. The customer in the particular industry may be more lenient than either the software provider or the partner and allow for discounts up to 50% in its pricing rules and may not incur a late fee until payments are 270 days late. Implementation of these differing rule sets can result in rule conflicts and collisions and difficulty in upgrading the software. There is a need for a system and method for realizing efficient rule content enhancement, allowing the enhancements from different parties to coexist and be updated (with new software releases or support packages) independently and to identify and eliminate conflicts or collisions between rules.

DETAILED DESCRIPTION

An embodiment of the present invention provides a computer-implemented method of enhancing computer representation of rules after implementation of the rules in a computer application. The method includes accessing a rule from a set of computer rules provided by a computer application. The rule includes a number of fields including an enhancement type field and an attribute field. The enhancement type field identifies the enhancements that can be made to the rule and the attribute field indicates how the rule will be executed. In response to receiving an attribute input into the attribute field and an enhancement type input into the enhancement type field, the rule is updated in the set of computer rules. The updated rule is implemented and operation of the updated rule is altered based on the input attribute and input enhancement type.

An embodiment of the present invention provides a computer-readable medium embodied with computer-executable instructions for causing a computer to execute instructions for enhancing computer rules after implementation of the rules in a computer application. The computer instructions include accessing a rule from a set of computer rules provided by a computer application. The rule includes a number of fields including an enhancement type field and an attribute field.

The enhancement type field identifies the enhancements that can be made to the rule and the attribute field indicates how the rule will be executed. In response to receiving an attribute input into the attribute field and an enhancement type input into the enhancement type field, the rule is updated in the set of computer rules. The updated rule is implemented and operation of the updated rule is altered based on the input attribute and input enhancement type.

An embodiment of the present invention provides a system for enhancing computer rules after implementation of the rules in a computer application including a display device, a data storage and a processor. The display device displays a graphical user interface. The data storage stores data, and the processor executes computer instructions. The processor executes instructions for accessing a rule from a set of computer rules provided by a computer application. The rule includes a number of fields including an enhancement type field and an attribute field. The enhancement type field identifies the enhancements that can be made to the rule and the attribute field indicates how the rule will be executed. In response to receiving an attribute input via the graphical user interface into the attribute field and an enhancement type input into the enhancement type field, the rule is updated in the set of computer rules. The updated rule is implemented and operation of the updated rule is altered based on the input attribute and input enhancement type.

Exemplary terminology used in the Specification includes the following terms and associated descriptions.

Attribute is a value or a description (textual or graphical) representing an action that occurs in the context of a process operation, such as a business process. The attribute can be an input event, an input condition, an output decision, or an output reaction. An example of an input condition or input event can be the price of a good, the quantity of goods per unit, non-payment of a bill, late payment, return of goods and the like. The terms "event" and "condition" can be used interchangeably without affecting the scope of the invention. An example of an output decision or output reaction can be to generate a delinquency notice in response to non-payment, the percentage of interest to charge when payment is received late, and the like. The terms "decision" and "reaction" can be used interchangeably without affecting the scope of the invention.

Content is a set of software elements and documentation that enable software to address specific requirements. These requirements can originate from, for example, customer groups, countries, industries, or the like. Content can fulfill one or more of the following criteria: it can convey information on the characteristics and capabilities of the software, it can define or changes the behavior of the software, and it can define or change the appearance of a user interface (UI). In addition, content can define the context in which the software needs to work (such as a composite application, country, industry, and so on), and influences all of the above-mentioned criteria.

Catalog is a collection of objects with related contents. The catalog presents a business user with those parts of business rules which are relevant for him. The content of business rules can be grouped and ordered into groups to present this rule content according to the semantics of the business rules. Examples of the content of a catalog include characteristic attributes, definitions, usage decision rules, and tasks.

Initial Object is a rule object that is created with an enhancement category that is set to other than "enhancement not supported". Decision tables and catalog support the enhancement concept. In an embodiment, the enhancement concept is implemented in a variety of other contexts and applications.

Enhancement is the delta data on an object (either initial or already enhanced). In an embodiment, delta content includes changed attribute values or additional attribute values, e.g., additional nodes in a catalog or additional lines in a decision table.

Enhancement Category indicates an object generally may be enhanced in following layers and systems. It can give a general indication of the manner or ways in which an object can be modified, if at all.

Enhancement Type defines with more specificity the ways (or if at all) in which an object part (e.g., a node in the catalog or a condition in a decision tree, a rule order in an object, and the like) may actually be enhanced in following layers and systems including a computer application. The possible enhancement types are defined by the enhancement category that is set for the object. The object part is acted upon by the computer application based on the enhancements to the rules in the following layers and systems including a computer application.

Figure 1:
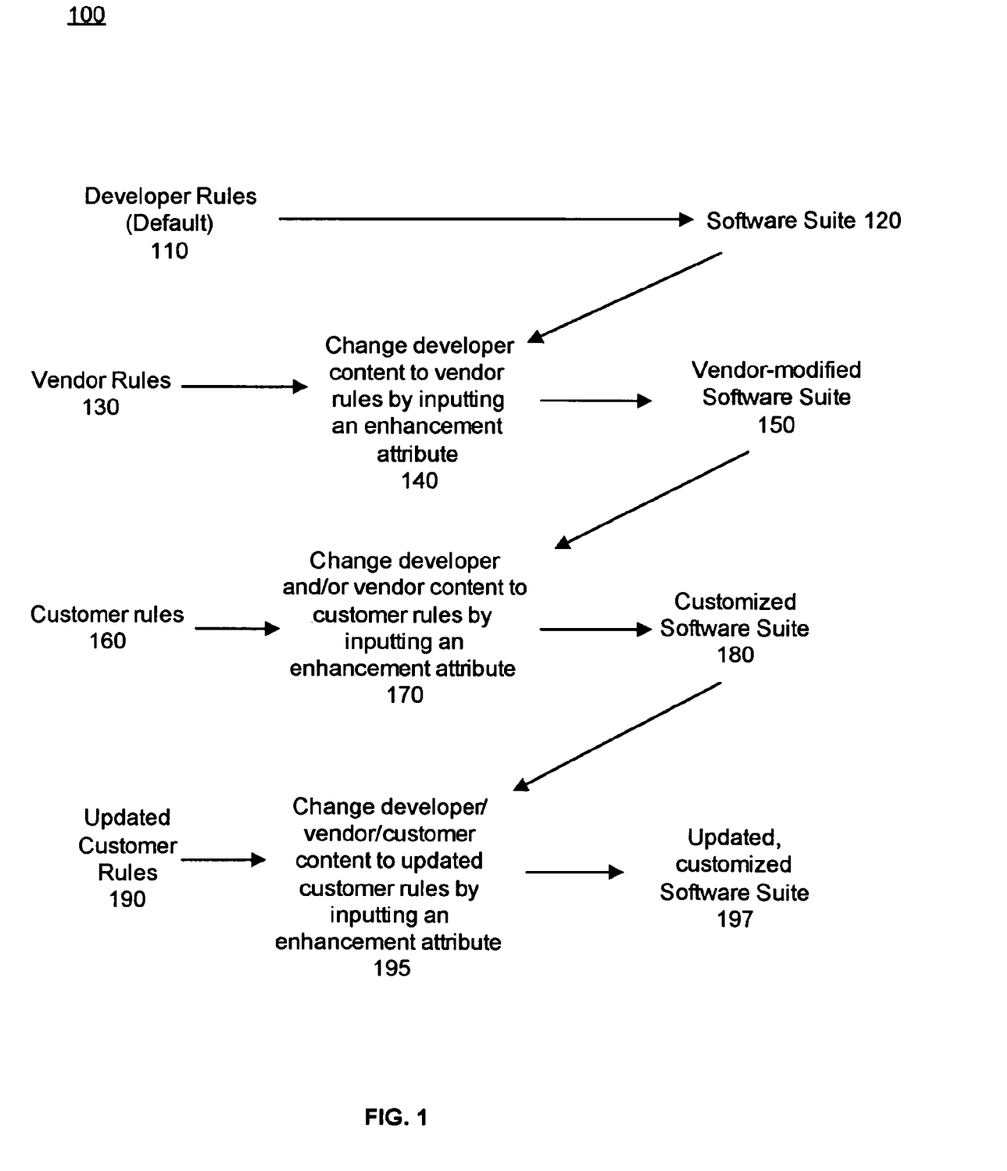
FIG. 1 illustrates an exemplary process for delivering software and software updates to a customer according to an embodiment of the present invention.

FIG. 1 illustrates an example process for delivering the computer representation of rules and updates to a customer according to an embodiment of the present invention. Software provider/developers have a number of applications for customers to implement different rules for, e.g., invoicing, shipping, and/or practically any other processes that can be controlled by rules. In an embodiment, the software developer must make certain assumptions as to how the business will be implemented. The software developer must have some default rules as to how the software will react to certain events that occur in the process.

In step 110, the software developer designs the software application with default rules. The computer representation of a rule can include a number of fields, including, e.g., at least one of an enhancement field, an enhancement type, content fields containing rule values and the like. The rules may also have a rules hierarchy, wherein rules established by a first party including an enhancement field are evaluated before rules established by a second party, which are evaluated before rules established by a third party. Each of the computer rules can include fields for attributes and enhancement type. In step 120, the software suite containing a set of default computer object rules set by the developer is available for delivery. A vendor/partner of the software developer can attempt to customize the software suite by enhancing a rule from the set of rules in the software suite provided by the software developer. Each of the set of rules can include a number additional attributes into which an enhancement of the rule can be input. The vendor can update the rules of the software developer content by inputting an enhancement of the rule using vendor specific rules 130. Alternatively, in an embodiment, the vendor implements its own rules that may or may not be revisions of the software developer default rules. In response to receiving an enhancement into the rule of the vendor rules, at step 140, the operation of the rule in the set of rules is changed giving the vendor-specific rule precedence over the developer rule, which may have been a default rule. In situations that are not covered by the vendor specific enhancement the default rules delivered by the developer still will be applied. In an embodiment, the vendor-modified software suite (150) is delivered to the customer. In an embodiment, the customer has customer rules (160) that are specific to the customers industry or location or particular business. By entering an enhancement to the rule, at step 170, operational precedence is given to the customer rules 160, over both the developer rules 110 and the vendor rules 130. The customer is provided with a customized software suite at step 180.

In an embodiment, suppose there is a change in the customer business or a business process of the customer, the change may require an update in the rules of the customer. The customer may develop updated customer rules 190. The customer can change, at step 195, the operational precedence of existing custom rules (including current developer and vendor rules) by changing customer specific enhancements of the rules in the rule set. The resulting rules are updated customized rules 197. In an embodiment, the customer adds and/or deletes rules from the rule set.

In an embodiment, when implementing the updated rule, the operation of the rule is altered based on the enhancements of the rule and the default rule. The enhancements of a rule can be ordered by the customer (i.e., a third party). By this the customer can define the precedence order of the enhancements. In an embodiment, the customer determines whether a particular enhancement takes precedence over the enhancement entered by the vendor, and/or another second party, and/or whether the enhancement entered by the vendor takes precedence over the enhancement entered by the developer, and/or another first party.

The following description will describe the above enhancement of rules in more detail with reference to a specific example, but such an example is not intended to limit the scope of the invention.

In an embodiment, by providing enhancement of rules, additional rule content is created for one or many rule objects regardless of the origin of the content. The decomposition and re-composition of the rule content works in a way that various rule content created independently from one another, for example, by any of software developer, partners or customers, can be merged into one object, such as a catalog or decision table. It is also possible to update the rule content independently from one another so that only specific parts of the merged object are updated.

The above example describes an exemplary embodiment of the invention in the context of only a supplier, vendor and customer for the sake of clarity and ease of understanding, however, it should be understood that the number of parties that can enhance a rule is not so limited. The embodiments of the present invention facilitate rule enhancement by any number of parties, including a multitude of developer personnel, a multitude of vendors, and/or a plurality of customers.

Although the following example is described using specific software objects, instances, routines and the like, it should be understood that these are exemplary to aid in an understanding of the invention, and are not intended to limit the claims to the specific example.

Figure 2:
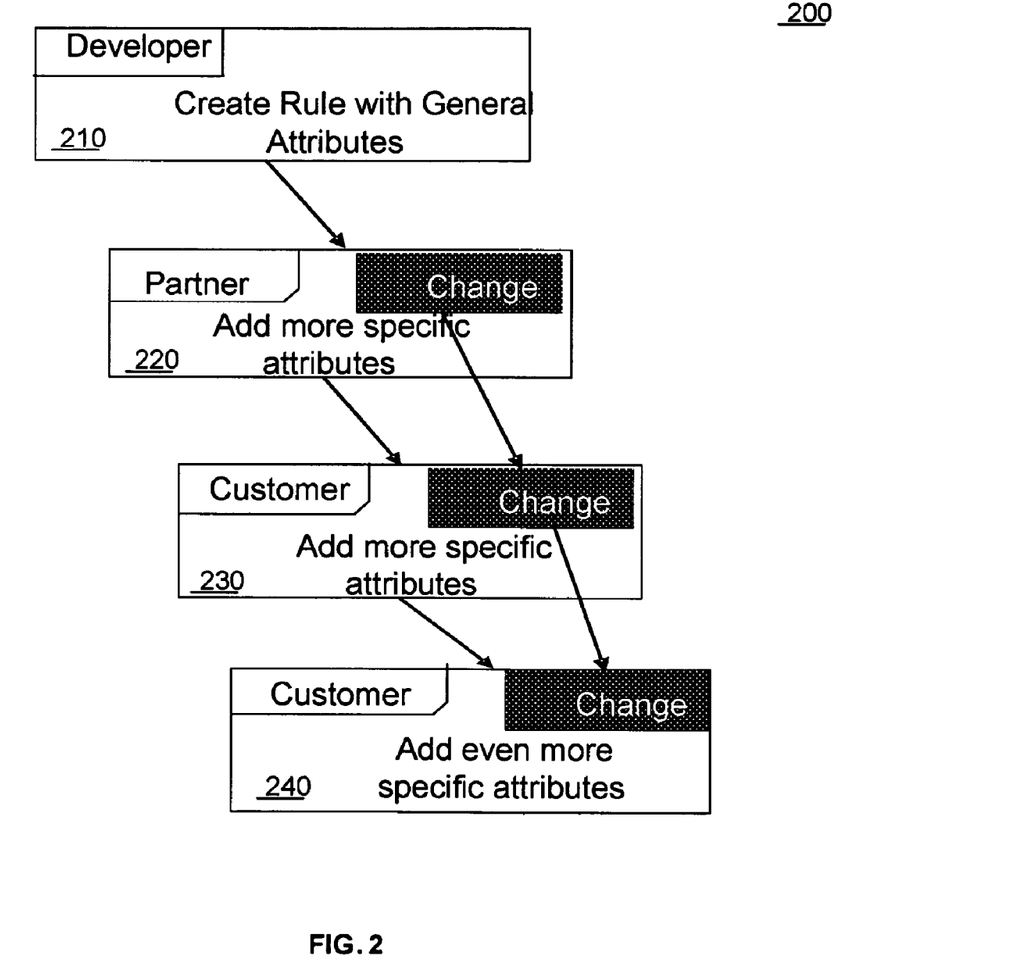
FIG. 2 illustrates enhancements to rule content according to an embodiment of the present invention.

FIG. 2 illustrates enhancements to rule content according to an embodiment of the present invention. The developer provides a rule that has a particular content at step 210. The rules can be business rules that are delivered by the developer with a default definition or content from development. In other words, the rule determines how the software will react to a certain event. For example, a client invoice has not been paid within 90 days. The business software generates a letter to the client indicating that the account is past due. Both the past due determination (the event) and the generation of the letter (the reaction or result) can be considered attributes of the rule.

In an embodiment, the partner/vendor adds content by adding more specific attributes to the rule content that changes the developer rule content or simply adds rule content by adding more specific attributes in step 220. This content added by the partner/vendor either overwrites and/or otherwise destroys the developer content. In an embodiment, the customer customizes the rules in the decision table by adding its own content with even more specific attributes at step 230, and may even further add more rule content in the future as shown in step 240. It can be determined whether the new customer content destroys the previous content and/or whether it is inconsistent with the previous content, in order to determine how the new content should be addressed and how the implemented rule content affects the output of the process according to its order. In an embodiment, conflicts between the rule content contributed by the various parties are resolved prior to implementation of the rules by a customer.

Figure 3:
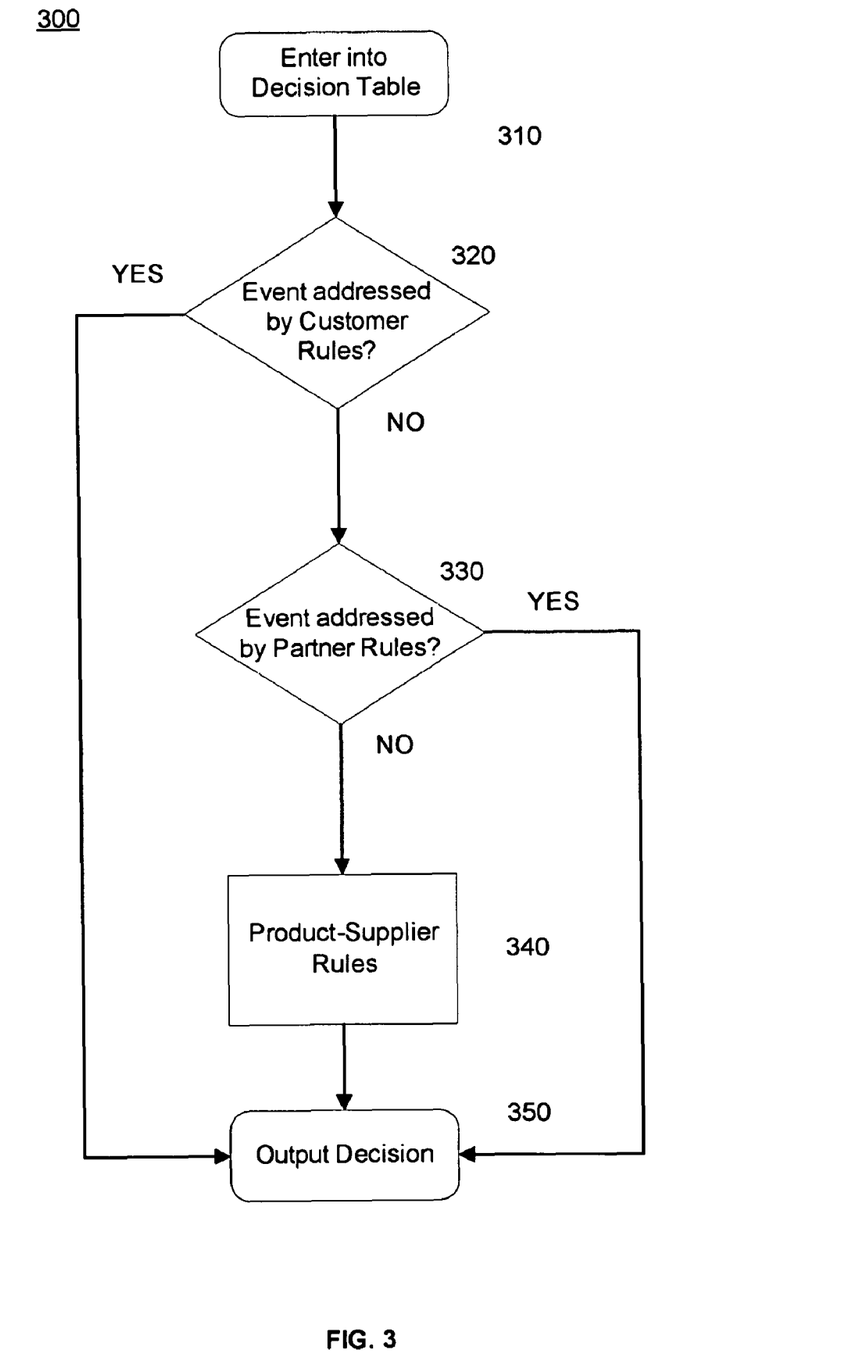
FIG. 3 illustrates a rule precedence methodology according to an embodiment of the present invention.

FIG. 3 illustrates a rule precedence methodology according to an embodiment of the present invention. The process 300 of the exemplary embodiment illustrates the implementation of a precedence of rules when a system is evaluating the rules during a business process. During a business process certain events occur, such as an invoice not being paid, that require a predetermined response be made. In step 310, the system enters into the decision table in response to the event to determine the response. At step 320, the customer rule content is implemented over the content in the rules of either the vendor or developer. If the customer rule content addresses the particular event by specifying a particular result, a decision is made and the process flows to output decision 350. Otherwise, if the customer rule does not specifically address the particular event in the business process, the precedence slips to the vendor rules. In step 330, the vendor rules are evaluated because a particular event is not addressed by the customer rules. If the vendor rule content addresses the particular event by specifying a particular result, a decision is made and the process flows to output decision 350. However, if the vendor rule content does not specifically address a particular event in the business process, the precedence slips to the developer rules. In step 340, the developer rules, which can be the default rules, are evaluated because a particular event is not addressed by either the customer rules or the vendor rules. In the exemplary embodiment, the customer rule content takes precedence over the vendor rule content, which takes precedence over the developer rule content.

Figure 4:
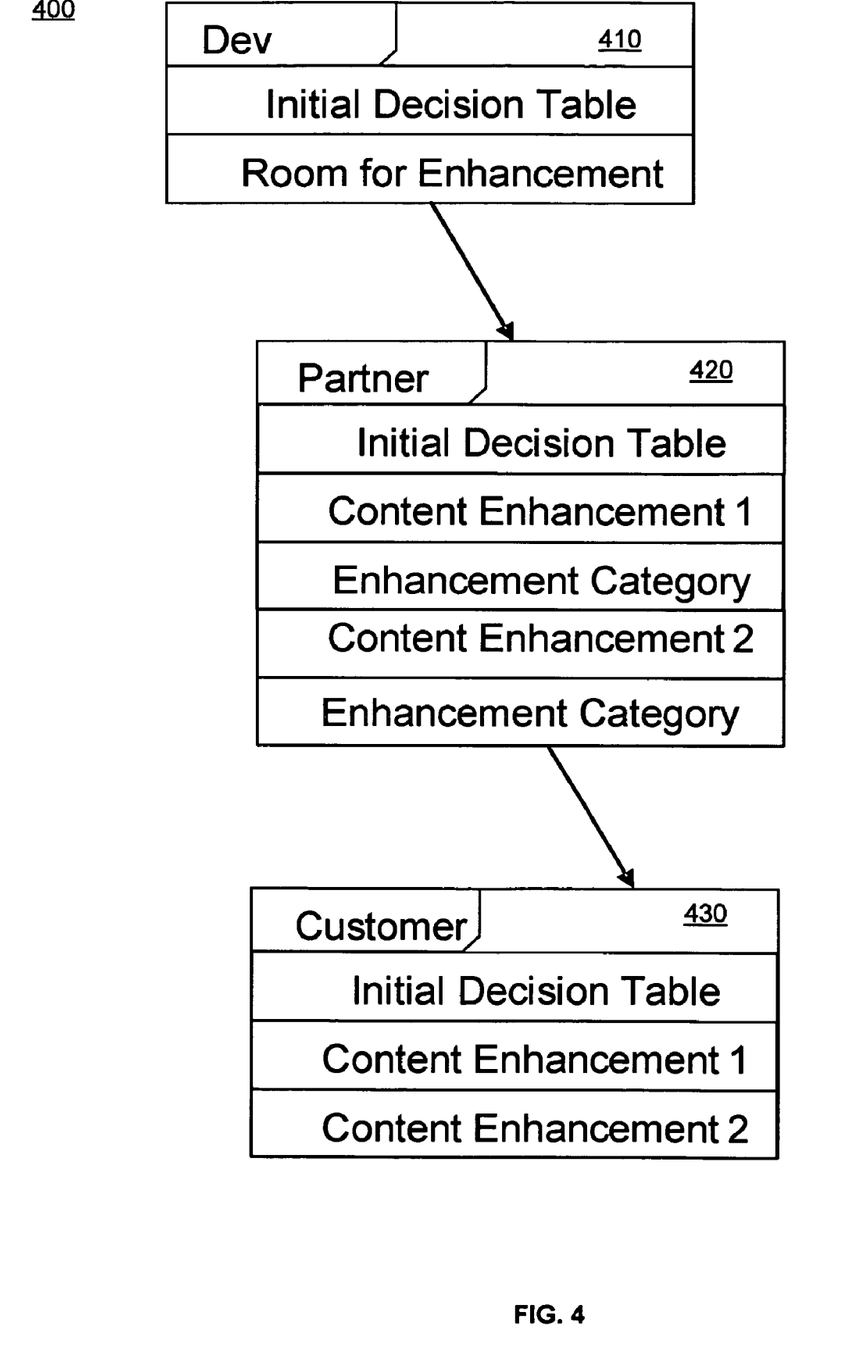
FIG. 4 illustrates an example rule content according to an embodiment of the present invention.

FIG. 4 illustrates exemplary rule content for an enhanced rule according to an embodiment of the present invention. The tool for creating rules implements a process 400 for rule development with the rules allowing enhancing the rule and capturing the ownership for each enhancement of the rule. In the example illustrated in FIG. 4, the developer at step 410 provides an initial decision table that can be enhanced by adding, deleting and/or changing content (e.g., outcomes of certain events, responses to inputs and the like) or any combination of adding, deleting or changing. At step 420, the partner receives the initial decision table including fields for the enhanced content (i.e., attributes, enhancement field type that can be consolidated as content enhancement 1) and a field for an enhancement category. The enhancement category defines in which way (or if at all) an object may be enhanced in following layers and systems in general. In an embodiment, based on the enhancement category, specific attributes can changed, for example, in the initial decision table, cells and columns can be changed. In an embodiment, the enhancement category indicates how users, e.g., customer, vendor, change the object. Future enhancements, such as those made at step 430, can be self-defining which indicates how the enhanced rule can be further enhanced, and, conversely, how the enhanced rule cannot be further enhanced.

In an embodiment, the content enhancement adds content into the rule. The rule can be a rule object. The changed or enhanced content, i.e., delta content, can be stored in extra tables that allow for re-merge of the object with the initial object or to allow the enhancement to be exported with merging with its initial object. In an embodiment, enhancements are time stamped the last time they are saved, and do not have a version identifier.

Figure 5:
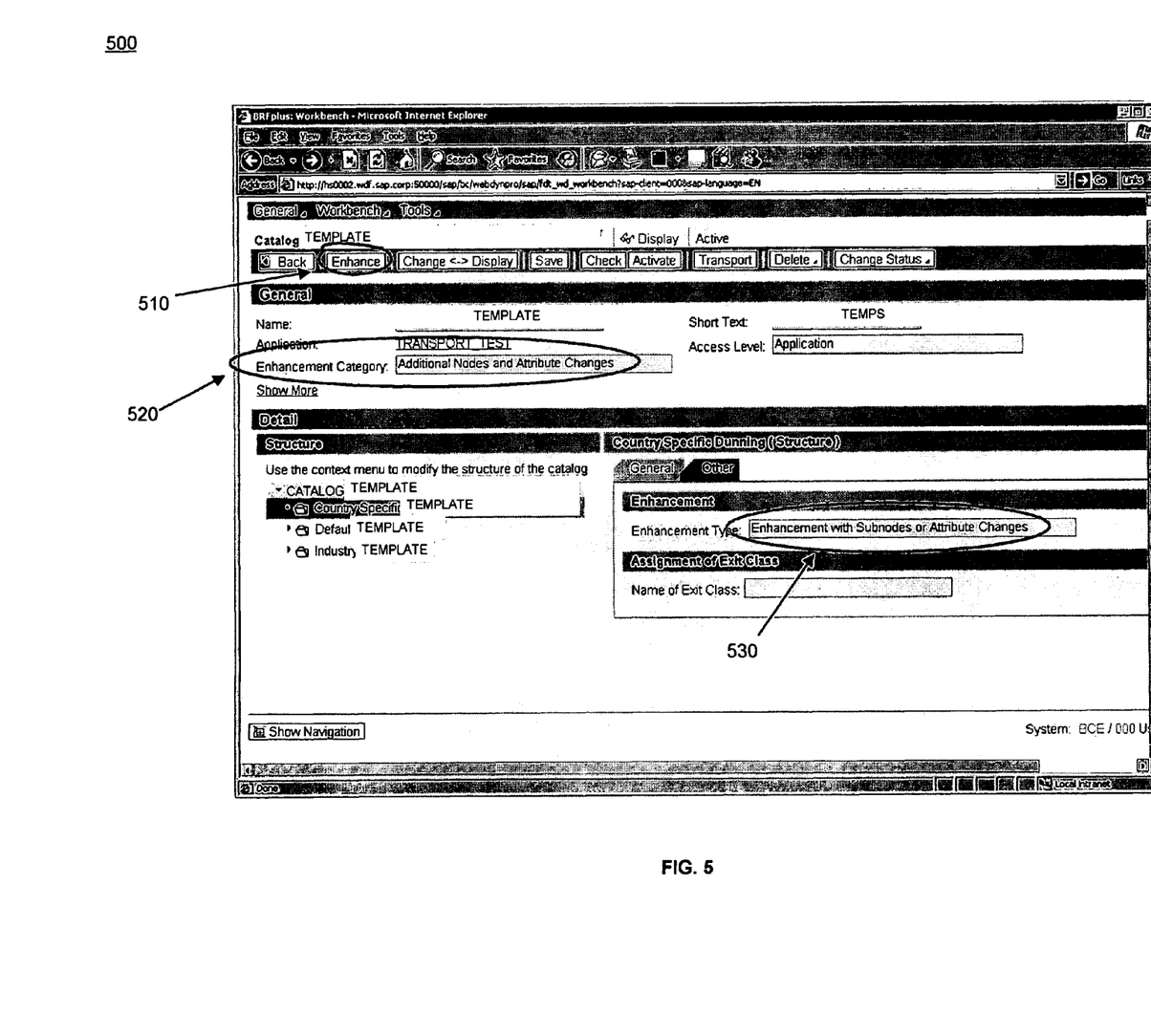
FIG. 5 illustrates a screenshot of an example graphic user interface for changing a catalog according to an embodiment of the present invention.

FIG. 5 illustrates a screenshot of an exemplary graphic user interface for changing a catalog according to an embodiment of the present invention. In the user interface 500, there are exemplary controls, such as enhance control 510, for indicating instructions for updating the catalog. The enhancement category 520 indicates the owner of the "catalog TEMPLATE" allowed enhancement by additional nodes and attributes. The enhancement type 530, in this example, indicates that country specific attributes can be enhanced with subnodes or attribute changes.

In an embodiment, via a control mechanism for the changeability of objects it is ensured that rules are only changeable in their original (or maintenance) system. In an embodiment, by also putting each single enhancement under the control of this general changeability control, it is ensured that enhancements can only be changed in their (or maintenance) system. In an embodiment, the enhancement category minimizes the changeability control for the rules itself, so that the rules can be enhanced but not changed in other than there original (or maintenance) system.

Example for the Usage of the Enhancement Concept in other contexts will be described with reference to FIG. 5.

Step 1: a developer defines a catalog with some folders and leaves. The developer defines a catalog, such as a catalog "Templates" 600, with the following initial structure:
Templates
Templates Developer Public Sector
  Decision Table Tax 1
  Decision Table Tax 2

The catalog is defined with enhancement category "Additional Nodes and Attribute Changes", which is shown, for example, in element 520 of FIG. 5. This enhancement category defines that nodes can be enhanced by sub nodes, so customers or partners may add further nodes. Other categories or more than one can be indicated, such as Additional Nodes, Additional Nodes and Attribute Changes, Additional Branch, Change Text of node, Change Attributes of node, Deactivate existing nodes, and/or Deactivate existing attributes. In a further embodiment, to the enhancement category for the catalog the developer also defines the node enhancement type, element 530, "Sub Nodes" for the nodes (e.g., folders) to allow enhancements. In an embodiment, using this interface, it is possible to enhance the folder "Templates" with sub nodes. Note that the catalog is assigned to an application like any other object in a business rules framework software suite, such BRFplus™ from SAP. Therefore, the catalog is assigned to a package, a software component and an application component, which in the example illustrated in FIG. 5, is the package "TRANSPORT TEST."

Step 2: Partners get the updated rule content by the software vendor redelivered catalog and enhance the catalog by additional nodes change the catalog in another way according to the enhancement category. Partner A wants to add nodes to the initial object as shipped from a software developer, such as SAP:
Templates
Templates Developer Public Sector
  Decision Table Tax 1
  Decision Table Tax 2
Templates Partner A
  Decision Table Tax 3
  Decision Table Tax 4
  Decision Table Tax 5

The partner first creates an issuer, and adds its nodes. The issuer can be, for example, a delivery truck that can bring one or many parcels into target systems. The changeability of an issuer is controlled by the general changeability control. In the example, the partner enhancement of the catalog is analogous to one package to be delivered. It is written into a transport file or shipped to the customer by an XML file. But, in an embodiment, the issuer also includes multiple enhancements. It is not necessary, but it is possible, to define an issuer per each enhanced object. The customer can decide to enable or disable issuers, and by doing so selectively applying the enhancements. In an embodiment, the partner enhancement nodes allow further enhancements by sub nodes.

Step 3: Customer gets the software, applies partner content and defines his own catalog content.

In an example, the customer has installed the redelivered catalog and the customer has applied the enhancements included in the partner packages. Now the catalog looks like this:
Templates
Templates Developer Public Sector
  Decision Table Tax 1
  Decision Table Tax 2
Templates Partner A
  Decision Table Tax 3
  Decision Table Tax 4
  Decision Table Tax 5
Templates Partner B
  Decision Table Tax 6

For example, the customer can define in his configuration system additional nodes:
Templates
Brazil
India
Germany
  2007
  2008
Templates Developer Public Sector
  Decision Table Tax 1
  Decision Table Tax 2
Templates Partner A
  Decision Table Tax 3
  Decision Table Tax 4
  Decision Table Tax 5
Templates Partner B
  Decision Table Tax 6

The customer also first defines an issuer. The customer using a user interface can define its additional nodes below the nodes included in the partner enhancement or the initial object include in the redelivered catalog that have a corresponding node enhancement type defined.

Step 4: Partner ships an update

For example, the partner has decided to update his content. In an embodiment, this can only be done on a compatible basis which means that the partner cannot take out nodes that have been open for enhancement.
Templates
Brazil
India
Germany
  2007
  2008

Templates Developer Public Sector
  Decision Table Tax 1
  Decision Table Tax 2
Templates Partner A
  Decision Table Tax 3
  2008 Update
    Decision Table Tax 4 2008 Update
    Decision Table Tax 5 2008 Update
Templates Partner B
  Decision Table Tax 6

In the above example, the nodes "Brazil", "India" and "Germany" belong to the customer. The nodes "Templates" and "Templates Developer Public Sector" belong to the Developer. The nodes "Templates Partner A", "2008 Update", "Templates Partner B" belong to the partners.

Content and sub nodes may be added independently from the other nodes coming from other layers. Imported content (via transport or XML) is merged into the catalog. It may also happen that nodes or leaves are deleted as long as this change is compatible. Nodes which are open for enhancement cannot be deleted because it is not clear if such nodes are used in following layers/systems.

Figure 6:
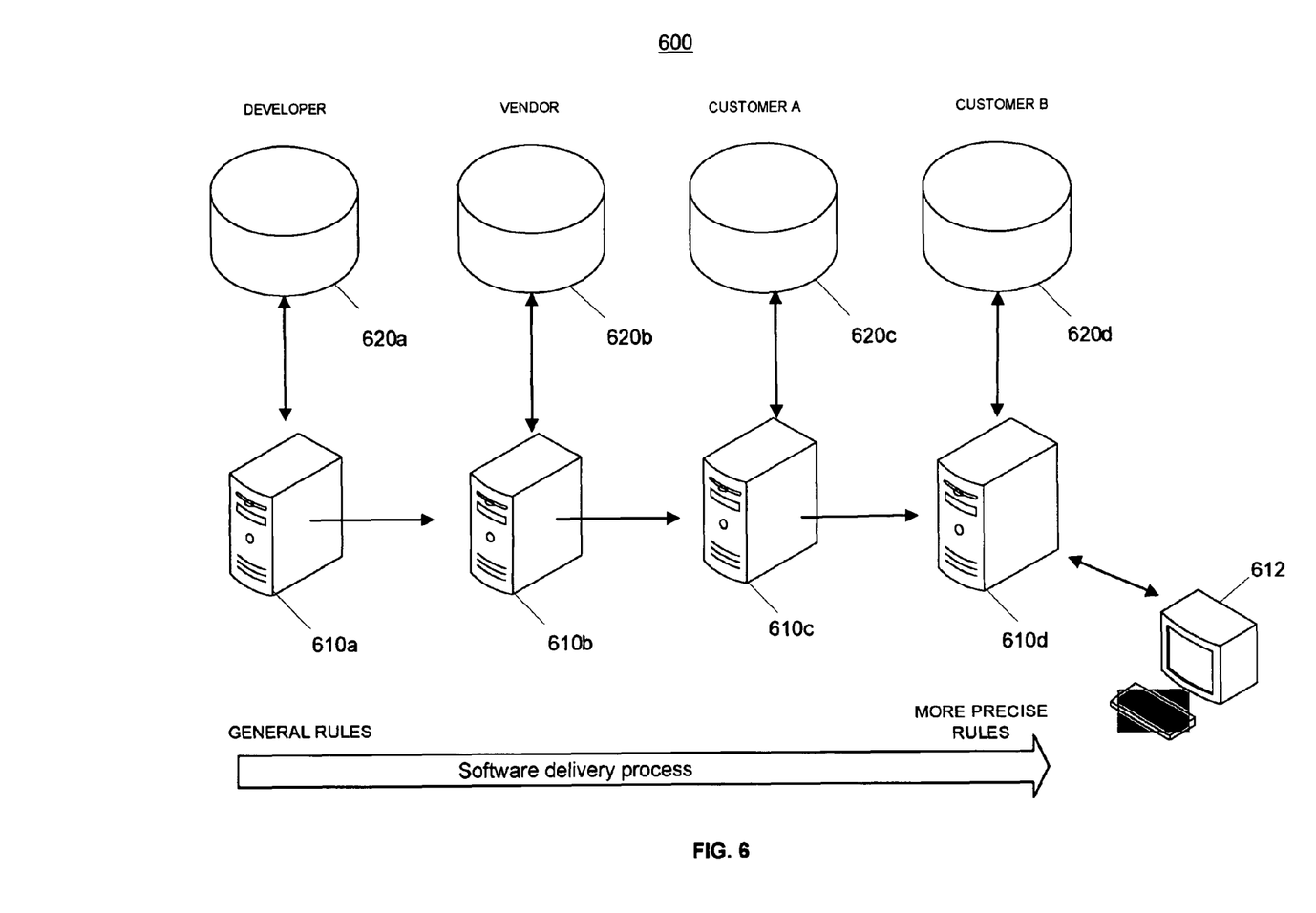
FIG. 6 illustrates an example system for delivering software suite enhancements according to embodiments of the present invention.

FIG. 6 illustrates an exemplary system for delivering software suite enhancements. The exemplary system 600 comprises servers 610a-d, data storages 620a-d, and at least one customer terminal 612. In an embodiment, the rules content is available on each of the servers 610a-d. Server 610a and data storage 620a, labeled DEVELOPER, can be used by a software developer. A rules engine on server 610a can generate a default rule set for a process, such as a business process, and stored on data storage 620a for later delivery. The default rule set on server 610a can be delivered to a vendor, and stored in data hosted on server 610b. Delivery can be accomplished by a number of ways, such as downloading, or uploading from disk, or other methods and means known by those of ordinary skill in the art. The default rule set can be changed along the supply chain of software delivery. The vendor using server 610b and data storage 620b can modify the rule content based on areas of specialization, countries in which the software will be used and the like. The vendor can provide the software to customers A and B, who will user servers 610c and 610d with data storage 620c and 620b to further customize the default rules and vendor modified rules according to the customers A and B particular business or provide general rules which have to be followed company wide, and other rules that can be added for a country or an industry specific specializations.

The software and rule content including program instructions can be stored on computer readable media such as discs, including CD and DVD, flash memory, hard drives including magnetic and optical drives, or any other suitable computer readable media, and that will cause a computer or processor to execute the program instructions. The software language used to write the software modules can be any that is suitable for implementing the described exemplary embodiments, and such languages are known to those of skill in the art.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A method for enhancing computer rules after implementation of the rules in a computer application, comprising:
  accessing a rule from a set of computer rules provided by a computer application, the rule comprising a number of fields including an enhancement type field and attribute fields, wherein the enhancement type field identifies the enhancements that can be made to the rule and the attribute field indicates how the rule will be executed;
  in response to receiving an attribute input into the attribute field and an enhancement type input into the enhancement type field from one party of a plurality of parties, updating the rule in the set of computer rules, wherein updating the rule includes:
    determining changes to be applied to the rule from the attribute input and enhancement type input, wherein determining the changes includes:
      analyzing whether there is a conflict between the rule and the attribute input and enhancement type input based on whether the attribute input and the enhancement type input were received from a particular party of the plurality of parties,
      and if there is a conflict, determining whether the attribute input and enhancement type input take precedence over the rule based on an analysis of whether the rule was previously created by a particular party of the plurality of parties, or previously modified by a particular party of the plurality of parties,
    storing the changes resulting from the attribute input and enhancement type input, and
    merging the changes resulting from the attribute input and enhancement type input into the rule; and
  implementing the updated rule, wherein operation of the rule in the computer application is altered based on the input attribute and input enhancement type.

2. The method of claim 1, wherein the set of computer rules includes a rules hierarchy, wherein rules established by a particular party of the plurality of parties take precedence over rules established by particular other parties of the plurality of parties.

3. The method of claim 1, wherein an attribute is either an input to the rule or an output result of a rule, wherein if an input the attribute identifies an event to which the rule outputs a specified result, and if an output result, the attribute identifies the resulting action of the computer in response to the input event.

4. A non-transitory computer-readable medium embodied with computer-executable instructions for causing a computer to execute instructions for enhancing computer rules after implementation of the rules in a computer application, comprising:
  accessing a rule from a set of computer rules provided by a computer application, the rule comprising a number of fields including an enhancement type field and an attribute field, wherein the enhancement type field identifies the enhancements that can be made to the rule and the attribute field indicates how the rule will be executed;
  in response to receiving an attribute input into the attribute field and an enhancement type input into the enhancement type field from one party of a plurality of parties, updating the rule in the set of computer rules wherein updating the rule includes:
    determining changes to be applied to the rule from the attribute input and enhancement type input, wherein determining the changes includes:

analyzing whether there is a conflict between the rule and the attribute input and enhancement type input based on whether the attribute input and the enhancement type input were received from a particular party of the plurality of parties, and if there is a conflict, determining whether the attribute input and enhancement type input take precedence over the rule based on an analysis of whether the rule was previously created by a particular party of the plurality of parties, or previously modified by a particular party of the plurality of parties, storing the changes resulting from the attribute input and enhancement type input, and merging the changes resulting from the attribute input and enhancement type input into the rule; and implementing the updated rule, wherein operation of the rule in the computer application is altered based on the input attribute and input enhancement type.

5. The non-transitory computer-readable medium of claim 4, wherein the set of computer rules includes a rules hierarchy, wherein rules established by a particular party of the plurality of parties take precedence over rules established by particular other parties of the plurality of parties.

6. The non-transitory computer-readable medium of claim 5, wherein an attribute is either an input to the rule or an output result of a rule, wherein if an input the attribute identifies an event to which the rule outputs a specified result, and if an output result, the attribute identifies the resulting action of the computer in response to the input event.

7. A system for enhancing computer rules after implementation of the rules in a computer application, comprising:
 a display device for displaying a graphical user interface;
 a data storage for storing data;
 a processor for executing computer instructions, the computer instructions comprising:
  accessing a rule from a set of computer rules provided by a computer application, the rule comprising a number of fields including an enhancement type field and an attribute field, wherein the enhancement type field identifies the enhancements that can be made to the rule and the attribute field indicates how the rule will be executed;
  in response to receiving an attribute input into the attribute field and an enhancement type input into the enhancement type field via the graphical user interface from one party of a plurality of parties, updating the rule in the set of computer rules, wherein updating the rule includes:
   determining changes to be applied to the rule from the attribute input and enhancement type input, wherein determining the changes includes:
    analyzing whether there is a conflict between the rule and the attribute input and enhancement type input based on whether the attribute input and the enhancement type input were received from a particular party of the plurality of parties,
    and if there is a conflict, determining whether the attribute input and enhancement type input take precedence over the rule based on an analysis of whether the rule was previously created by a particular party of the plurality of parties, or previously modified by a particular party of the plurality of parties,
   storing the changes resulting from the attribute input and enhancement type input, and
   merging the changes resulting from the attribute input and enhancement type input into the rule; and
  implementing the updated rule, wherein operation of the rule in the computer application is altered based on the input attribute and input enhancement type.

8. The system of claim 7, the graphical user interface displayed by the display device, further comprising:
 a first user control for indicating instructions for updating a rule;
 a second user control that indicates that the rule is allowed enhancement according to a first inputted enhancement type; and
 a third user control that indicates that specific attributes can be enhanced according to a second inputted enhancement type, wherein the second enhancement type can be the same or different from the first inputted enhancement type.

* * * * *